April 9, 1935.  F. L. MOCAER  1,996,969
TRAP
Filed July 13, 1934
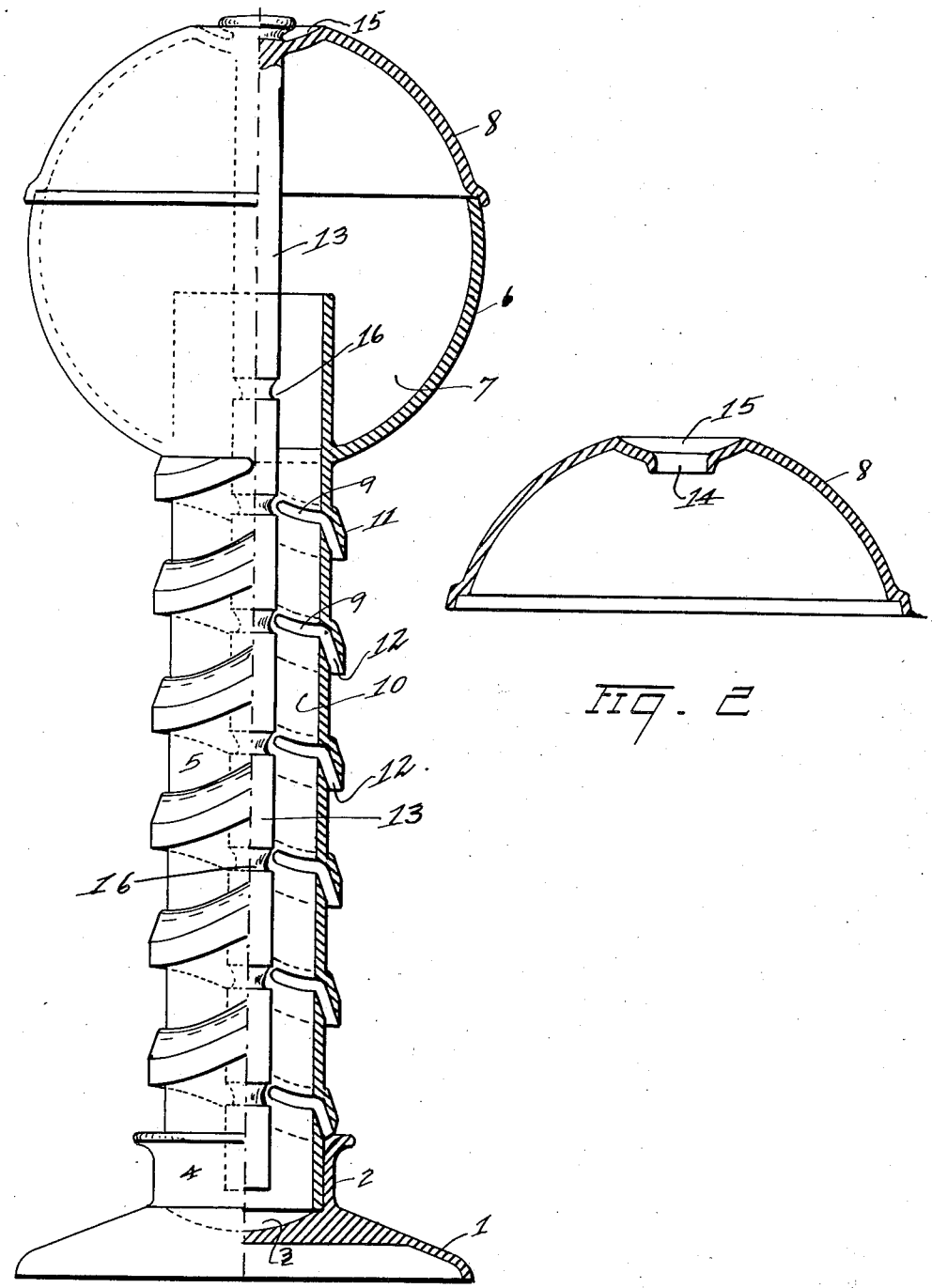
INVENTOR
BY François L. Mocaer
ATTORNEY Patented Apr. 9, 1935

1,996,969

UNITED STATES PATENT OFFICE 1,996,969

TRAP

Francois L. Mocaer, Pasco, Wash.

Application July 13, 1934, Serial No. 734,956

3 Claims. (Cl. 43—121)

This invention relates to traps, more particularly such traps as are adapted to catch winged insects such as flys, and has for one of its objects to provide a trap that by the proper distribution of the bait will be highly efficient.

Another object of the invention is to produce a trap that is attractive and that has its bait contained within the trap.

A further object of the invention is to provide a trap that may be readily cleaned.

A further object of the invention is to provide a trap that is cheap to manufacture and that is ornamental.

With these and other objects in view reference is now had to the accompanying drawing in which Fig. 1 is a side elevation of the trap, partly in section; and Fig. 2 is a vertical section of a modified form of cover.

Having reference to the drawing like numerals refer to like parts throughout the several views and the numeral 1 refers to the base of a trap and consists of any simple structure that will support the trap and in this case the base is provided with a centrally positioned cup 2, the bottom of which cup being hollowed to provide a small water basin 3, and the sides 4 thereof providing means to receive a column 5 supported therein as shown. Obviously however these two parts may be made integral.

The column 5 is hollow and preferably cylindrical and extends upward and into a globular container 6 with which the column is preferably made integral, the column 5 projecting thereinto to provide a second or elevated basin 7, substantially in the manner shown, wherein the depth of the basin is regulated by the height that the column projects thereinto.

A cover 8 closes the container 6 in the usual manner of covers and has a supporting purpose to be presently explained.

About the column 5 is an ascending series of trap apertures 9 formed in the wall 10 thereof and these apertures are concealed by a spirally formed apron 11, and projecting thereunder for partial concealment is formed a pathway 12 that is likewise continuously ascending whereby to direct the natural ascending movement of the fly until its eventual entrance into one of said apertures 9.

The cover 8 is provided with a suspended bait rod 13 which may be integral therewith, as shown in Fig. 1, or the cover may be provided with an opening 14 in its top 15, as shown in Fig. 2, into which the bait rod 13 may be inserted.

This rod 13 is provided with bait carrying pockets 16 formed thereon as shown and these pockets are recessed into the rod whereby, after filling, all surplus bait (not shown) may be wiped off by merely drawing the rod through a wiping cloth, in the usual manner of such cleansing.

The pockets 16 are spaced apart uniformly and the spacing is such that the bait therein will be located substantially opposite to each aperture 9 to be directly opposite to the fly at some time in its circumambulation, and by the relative diameters of the rod 13 and the column 5 the bait will be located adjacent to and in close proximity with, as well as opposite each aperture providing a strong attraction thereat.

In use the bait rod 13 is loaded and cleaned, then inserted into the column, the cover closing the container in this operation.

The trap is now located in the desired location and the circulation of air through the rather elongated circumferential apertures will carry the odor whereby the insect will be attracted to approach the trap, and alighting thereon the strength of the odor will be increased by its closer proximity as the fly follows its natural bent and climbs upward. Hence with the direct path upward intercepted by the apertures it will follow the pathway until finally when it will enter one of the apertures to alight on the bait rod.

Again following its natural instinct to rise it will eventually reach the container where it will finally drop into the upper basin.

Should it drop downward for any reason the water of the lower basin will discourage its alighting there and unless through fatigue it drops into the water thereof it will rise to the container as before.

Having thus described my invention I claim:

1. A trap comprising a hollow column, a continuously ascending covered pathway formed about said column, trap apertures formed in said pathway and disposed for partial concealment thereby, a container supported by said column, and means to present bait adjacent to and substantially opposite said trap apertures.

2. A trap comprising a base, a cylindrical column mounted on said base and provided with an ascending pathway interspersed with trap apertures, a container supported by said column, and provided with bait carrying pockets disposed substantially opposite said trap apertures.

3. A trap comprising a base, a hollow column mounted on said base, a continuously ascending concealed pathway formed about said column, trap apertures formed in said pathway, a container supported by said column and arranged therewith to provide a basin, and provided with a removable cover, and a bait rod secured to said cover for suspension within said column, and provided with bait carrying pockets disposed substantially opposite said apertures.

FRANCOIS L. MOCAER.